United States Patent [19]

Aubrun

[11] Patent Number: 4,553,891
[45] Date of Patent: Nov. 19, 1985

[54] HEADED COTTER PIN WITH SAFETY ANNULAR RETAINING MEANS

[76] Inventor: Claude Aubrun, Renage 38140 Rives, France

[21] Appl. No.: 337,874

[22] Filed: Jan. 7, 1982

[30] Foreign Application Priority Data

Jan. 9, 1981 [FR] France .................................. 81 00592

[51] Int. Cl.⁴ ............................................. F16B 21/00
[52] U.S. Cl. ..................................... 411/351; 403/379; 411/511
[58] Field of Search ............... 411/511, 337, 340, 341, 411/347, 351, 356, 357, 513, 516; 403/379; 24/589, 598

[56] References Cited

U.S. PATENT DOCUMENTS

| | | | |
|---|---|---|---|
| 2,482,907 | 9/1949 | Hagen | 411/341 |
| 2,759,388 | 8/1956 | Annis . | |
| 2,945,704 | 7/1960 | Korn | 403/379 X |
| 4,036,097 | 7/1977 | Greenwood | 411/340 |
| 4,443,144 | 4/1984 | Defrancq | 411/511 X |

FOREIGN PATENT DOCUMENTS

| | | | |
|---|---|---|---|
| 240 | 9/1899 | Austria | 411/340 |
| 0016421 | 9/1980 | European Pat. Off. . | |
| 259212 | 10/1912 | Fed. Rep. of Germany | 411/351 |
| 2909910 | 9/1980 | Fed. Rep. of Germany | 411/351 |
| 386161 | 9/1973 | U.S.S.R. | 411/351 |

*Primary Examiner*—Gary L. Smith
*Assistant Examiner*—Lloyd A. Gall
*Attorney, Agent, or Firm*—Beveridge, DeGrandi & Weilacher

[57] ABSTRACT

This safety headed cotter pin having an annular holding device comprises a substantially cylindrical body, a head formed integrally with this body, an annular device adapted to prevent any undesired removal of the cotter pin and retaining means comprising a stop-forming element rigid with the head and adapted to cooperate with at least one of the end portions of the annular device in order to limit the permissible movement of this device in the direction away from its closed position, this cotter pin being intended notably for use in various farming vehicles and machines, for example for keeping mechanical component elements on parts such as shafts and the like.

10 Claims, 25 Drawing Figures

HEADED COTTER PIN WITH SAFETY ANNULAR RETAINING MEANS

BACKGROUND OF THE INVENTION

The present invention relates in general to headed cotter pins or like mechanical fastening devices and has specific reference to a headed cotter pin provided with safety means for retaining the pin on shafts, spindles, gudgeon pins, studs or anchoring bolts through which the pin is inserted.

THE PRIOR ART

As a rule, cotter pins of this type are provided with a flexible spring-like ring or clip pivoted in a pair of off-set holes provided laterally in the pin head, whereby the ring is urged by its inherent resiliency in its holding position.

However, cotter pins of this general type are scarcely reliable. In fact, the ring flexibility decreases after a relatively short time and thus the ring tends to open, inasmuch as the pins to be controlled or fastened thereby are generally exposed to jarring and/or shocks. Moreover, when the ring is open, the pin escapes and the parts previously coupled thereby are thus released and exposed to serious damages.

Various means have already been proposed for avoiding these inconveniences, for example by varying the angle formed between the axes of the off-set holes in the pin head, and also by varying the shape and quality of the spring-forming flexible ring. Another proposition consisted in forming either rounded bosses on the pin head for cooperating with the ring, or a notch at the base of the pin body engaged by the clip. However, none of these solutions proved to be really satisfactory in actual practice, for the ring ends still tend to divaricate completely as a consequence of wear and tear, or of relatively fierce shocks as currently observed in the operation for example, of farming machines.

SUMMARY OF THE INVENTION

It is the primary object of the present invention to solve the problems still set by cotter pins according to the present state of the art by providing an improved safety cotter pin capable, through its various forms of embodiment, of very efficiently retaining the ring in its closed position.

The safety cotter pin according to the present invention comprises a pin, a head formed integrally with one end of the pin, and a substantially annular device or open loop having its pivot-forming ends fulcrumed to said head, on either side thereof, on substantially parallel spaced transverse axes, this annular device being adapted to surround the part through which the pin is inserted, in order to prevent any undesired removal of the pin, retaining means also being provided for preventing the annular device from being released or from departing from the closed position in which it locks the cotter pin against any undesired removal or release.

According to the present invention, said retaining means comprises a stop element mounted on the pin head and adapted to cooperate with at least one of the end portions of the annular device in order to limit the permissible movement of this device in the direction away from said closed position.

In a first and preferred form of embodiment said stop element may consist of a transverse stud mounted on said head and capable of limiting the angular movement of said annular device.

In a modified version of this first and preferred form of embodiment, in which the ends of the annular device or open loop are pivoted to said head about two off-set transverse axes, said transverse stud may advantageously consist of one of the pivot-forming end portions of the annular device, which extends through said head and projects beyond the opposite pivot-forming end portion of the annular device.

In this modified version, said retaining means may also comprise a wedge member movable along said stud-forming end of the annular device so that said wedge member can be either disposed between said stud-forming end and said other, pivot-forming end portion of the annular device, or removed therefrom.

In a further modified version the ends of the annular device are also pivoted to said pin head about off-set transverse axes, and said transverse stud extends completely through said head and has formed at one end a shoulder-like stop collar adapted to bear against said head and a cavity adapted to receive one of the pivot-forming ends of said annular device, the other end of said stud projecting in front of the end portion of the annular device which is adjacent said other pivot-forming end thereof in order to constitute said stop element.

In this last-mentioned modified version said other end of the stud may advantageously be bevelled so that the stud itself acts as a bolt engageable by the end portion of the annular device which is adjacent to the other pivot-forming end thereof.

In this modified version, said other end of the stud may, in a different form of embodiment, comprise a notch opposite a solid portion thereof, said stud comprising means permitting rotation of same so that either said notch or said stop-forming solid portion can be brought in front of the said end portion of said annular device.

In this other modified version translation means may, in a different form of embodiment, be provided for moving said stud across and inside said head between a forward position in which said other end of said stud constitutes said stop, and a retracted position in which said other end of said stud is free and the annular device is released.

In a particularly advantageous form of embodiment, said stud collar and said head may comprise registering inclined faces, and said stud may comprise means for rotating same, whereby the rotation of said stud will allow the transverse movement of said stud by causing said inclined faces to slip on each other from said forward position and said retracted position. Moreover, said inclined faces may be shaped to hold said stud in its forward or retracted position even when the annular device is caused to pivot.

In a third modified version of said form of embodiment of the safety cotter pin of this invention, said transverse stud may extend through said head and be provided with at least one notch and one stop-forming solid portion, and this stud may be movable so that either its solid portion or its notch can be brought in front of the end portion of the annular device adjacent one of the pivot-forming ends thereof.

In this third form of embodiment, said notch and said solid portion may follow each other in a transverse direction, and means may be provided for causing the transverse translation of said stud.

In a modified version of this third form of embodiment, said notch and said solid portion may oppose each other and means may be provided in this case for pivoting said stud.

In a fourth modified version of this form of embodiment, said transverse stud may be secured to the pin head so as to project laterally in front of at least the end portion of the annular device adjacent one of its pivot-forming ends, a wedge member being movable along said stud so as to lie between said stud and the end portion of the annular device and be removable therefrom.

In these last two modified versions said stud may advantageously extend in front of the annular device. However, if this device comprises at least one extension laterally of said head beyond one of its pivot-forming ends, the transverse stud may extend across the head at the rear of said extension.

In a fifth modified version of said form of embodiment, said transverse stud may be rigid with at least one link pivoted to said head and adapted to pivot so as to cause said stud to lie in front of the end portion of the annular device when the latter is in its closed position.

In a second preferred form of embodiment of the safety cotter pin according to the present invention, wherein the pin body has a substantially axial notch formed therein, into which the annular device can be inserted, it is contemplated that at least one of the pivot forming ends of the annular device be fulcrumed in a lateral elongated recess formed in said head and that said stop-forming element consists of a stud or needle which, in its forward position, penetrates into said recess and constitutes a stop member with respect to said pivot forming end of the annular device in said recess so as to retain said annular device in said axial notch.

In a third preferred form of embodiment of the safety headed cotter pin according to the instant invention said stop forming element may consist of at least one lateral boss formed on said head and provided with a transverse face engaged by the end portion of said annular device which is adjacent one of said pivot-forming ends when the annular device is in its closed position, said boss being shaped to permit the pivotal movement of said annular device to its closed position.

In a fourth preferred form of embodiment of the safety headed cotter pin according to this invention, said stop forming element may consist of a ring rigid with the annular device so as to form therewith a flexible V-shaped spring, said ring bearing against a stop formed on and in front of said head when said spring is V-shaped, in order to keep said annular device in said closed position.

In a modified version of this specific form of embodiment, the annular device and said ring may constitute a single and same member.

The various forms of embodiment of the improved safety headed cotter pin with annular retaining member and their modified versions according to the present invention will now be described more in detail, by way of illustration, not of limitation, with reference to the accompanying drawings.

THE DRAWINGS

DESCRIPTION OF THE PREFERRED EMBODIMENTS

Figure 1:
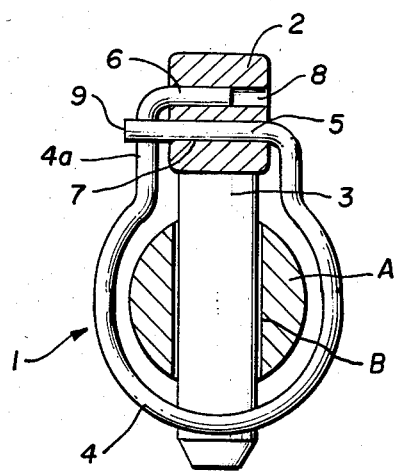
FIGS. 1 to 3 illustrate different versions of a first form of embodiment.
Figure 2:
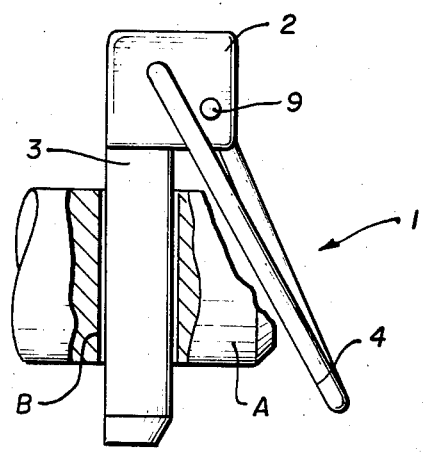

As illustrated in FIGS. 1 and 2 of the drawings, a safety headed cotter pin according to the present invention comprises essentially a head 2, a pin or body 3 formed integrally with said head 2 and a substantially annular device 4 constituting a kind of open loop of which the two ends 5 and 6 are engaged in holes 7 and 8, respectively, formed in the head 2 so as to constitute means for pivoting the annular device 4 about substantially parallel axes; the pin illustrated in FIGS. 1 and 2 is designated in general by the reference numeral 1. In this example the body 3 extends through a substantially diametral hole B formed in a shaft A, the ring 4 being adapted on the one hand to surround said shaft A by bearing on the spindle 3 so as to prevent the removal of the pin 1, and on the other hand to be moved away from this position for releasing the pin when required.

In the example illustrated in FIGS. 1 and 2, the pivot-forming end 5 of ring 4 extends completely through the head 2 and projects therefrom as shown at 9; it being somewhat spaced laterally from and parallel to the adjacent end portion 6 of ring 4 to constitute a stud 9. With this arrangement, the ring can move angularly through an angle of about 15° to 30° between the body 3 and the stop forming stud 9. Since this ring 4 is flexible, it constantly tends to move away from stud 9 and to bear against the body 3. When pulled to a position in which it abuts the stud 9, this ring will not interfere with its mounting on shaft A or with its removal therefrom, for its permissible angular movement is sufficient for clearing the shaft end.

Figure 3:
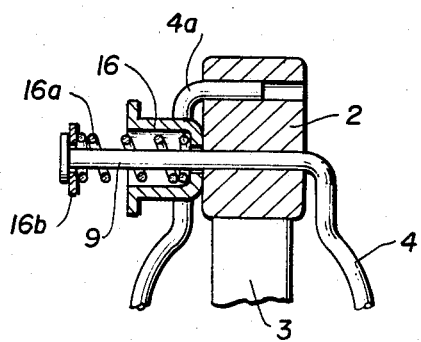

In the modified structure illustrated in FIG. 3, an annular, flanged and cup-shaped wedge member 16 is mounted on the stud 9 and urged towards the head 2 by a spring 16a bearing with one end against said wedge member 16 and with the opposite end against a washer 16b retained by the outer mushroom-shaped end of stud 9. If desired, this wedge member may be disposed between the end portion 4a of ring 4 and the stud 9 so as to lock said ring 4 in bearing engagement with the pin body 3, but it can be removed by moving the member 16 against the force of spring 16a to open the ring 4 as already explained hereinabove with reference to the first form of embodiment shown in FIGS. 1 and 2.

In the following forms of embodiment the stop-forming stud is not an integral portion of ring 4 but formed independently thereof.

Figure 4:
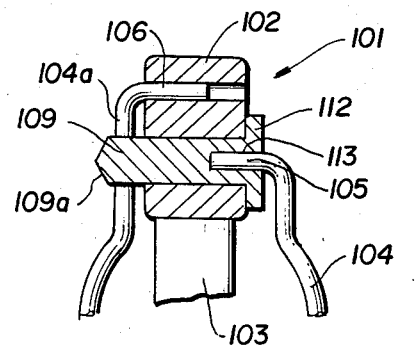
FIGS. 4 to 8 illustrate different versions of a second form of embodiment.

In the example shown in FIG. 4, the transverse stud 109 extends through the head 102 of pin 101 and has at one end a stop collar constituting a shoulder 112 held against the head 102 by the flexibility of ring 104 and also by a recess 113 receiving the pivot-forming end 105 of ring 104, the opposite pivot-forming end being fulcrumed to head 102. The other end 109a of stud 109 is bevelled and projects just beyond the end portion 104a of ring 104 which is adjacent its other pivot-forming end 105. Since the ring 104 is flexible and the end 109a of stud 109 is bevelled, this stud 109 acts as a lock bolt to keep the ring 104 in its closed position in which it bears against the pin body 103 while permitting the complete opening thereof under a considerable effort. In a modified version, it would be possible to form male screw-threads on stud 109, to tap the head 102 and provide a hexagonal collar 112, thus permitting a transverse translation of stud 109 for removing the end 109a from the end face 104a.

Figure 5:
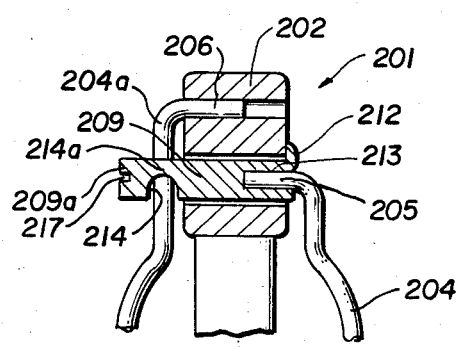
Figure 6:
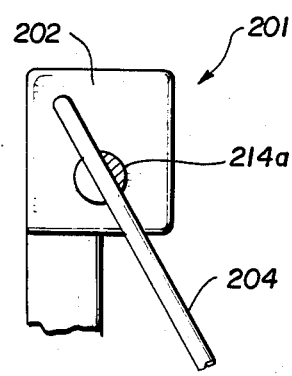

As in the example illustrated in FIG. 4, the safety cotter pin shown in FIGS. 5 and 6 comprises a transverse stud 209 extending through the head 202 and having a stop collar 212 bearing against said head 202 and a recess 213 receiving the pivot-forming end 205 of ring 204, the other pivot-forming end 206 of this ring being pivoted directly to the head 202.

In this example, the other end 209a of stud 209 comprises an outer solid portion 214a and a notch or recess 214, both registering with the end portion 204a adjacent the pivot-forming end 206 of ring 204. The end 209a of stud 209 comprises a diametral slot 217 engageable by a screwdriver for rotating this stud 209 so that it can present, in alignment with the end portion 204a of ring 204 adjacent its pivot-forming end 206, either the solid portion 214a (which in this case acts as a stop member keeping the ring 204 in its closed position), or the notch 214 permitting an angular excursion of ring 204 through an angle of 15 to 30 degrees, for inserting or removing the stud 201 as in the example illustrated in FIGS. 1 and 2.

It will be seen that the screwdriver slot 217 could be replaced by any other known means permitting the rotation of stud 209, such as a lever or, on this stud 209, polygonal internal or external faces adapted to be engaged by a spanner or the like.

Figure 7:
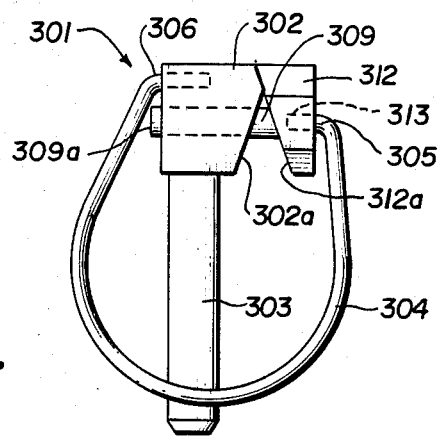
Figure 8:
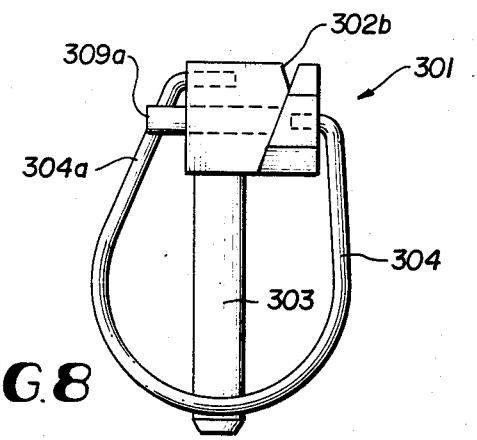

In the example illustrated in FIGS. 7 and 8, the safety cotter pin 301 also comprises a stud 309 extending through the head 302 and has at one end a shoulder-forming stop collar 312 and a recess 313 receiving the pivot-forming end 305 of ring 304 of which the opposite end 306 is pivoted to the head 302 at an off-set position.

In this example, the head 302 of cotter pin 301 and the shoulder 312 of stud 309 are provided with registering flat faces 302a and 312a, respectively, inclined in relation to the axis of stud 309, so that when the stud 309 is rotated the inclined flat faces 302a and 312a of head 302 and the shoulder 312, in conjunction with the flexibility of ring 304, cause the stud 309 to move transversely from a forward position to a retracted position, the ring constantly urging the stud to its forward position.

In this forward position the faces 302a and 312a engage each other and the other end 309a of stud 309 projects beyond the end portion 304a of ring 304 which is adjacent its pivot-forming end 306, so as to constitute a stop means for the ring 304 when the latter is folded to its closed position in engagement with the pin body 303, this position of stud 301 being visible in FIG. 8.

In the retracted position, said inclined faces 302a and 312a of head 302 and shoulder 312 form a V, and the end 309a of stud 309 is recessed within the head 302 so that ring 304 is released; thus, this ring 304 can be moved from its closed position to its fully open position, and vice versa. This position of stud 309 is visible in FIG. 7 showing that the ring 304 can move past the end 309a of stud 309 without interfering therewith.

To keep the stud 309a in its retracted position, there is provided, in the projecting portion of head 302, a flat face 302b inclined in the opposite direction with respect to the face 302a engaged by face 312a of shoulder 312 when the stud 309 is retracted, so that the ring 304 can be actuated without pivoting the stud 309.

In the example illustrated, to pivot the stud 309 the shoulder 312 consists of a nut. However, a different arrangement, comprising, for example, a screwdriver slot, may be contemplated if desired.

In the modified version of the form of embodiment illustrated in FIGS. 7 and 8, the inclined surfaces 302a, 302b and 312a may be curved instead of flat.

Figure 9:
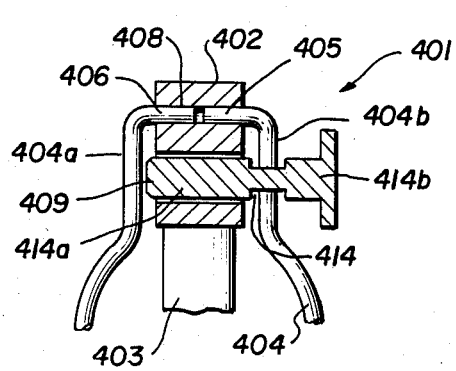
FIGS. 9 to 18 illustrate different versions of a third form of embodiment.

In the example shown in FIG. 9, the ring 404 is pivoted symmetrically on either side of head 402 of cotter pin 401 by engaging a through hole 408 and a transverse pin 409 extends completely through the head 402 and can project in front of the arms 404a and 404b of ring 404 which are adjacent the ring ends constituting said pivot means 405 and 406. The stud 409 has an annular groove or notch 414 formed therein between two solid portions 414a and 414b, with portion 414a lying within the head 402 and having a length corresponding substantially to the head width. The stud 409 can be moved transversely from a first position, in which the end portion 404a of ring 404 is free and the groove 414 registers with the end portion 404b of ring 404, and a second position in which the solid portions 414a and 414b of stud 409 register respectively with the end portions 404a and 404b of ring 404. In said first position, the ring 404 can be moved through an angle of about 15 to 30 degrees, the arm 404b penetrating into the notch 414, whereas in the second position ring 404 is locked and engaged against the spindle 403.

In the example shown in FIG. 9, the solid portion 414a of stud 409 is plain whereby the transverse movement of this stud is a simple sliding movement.

Figure 10:
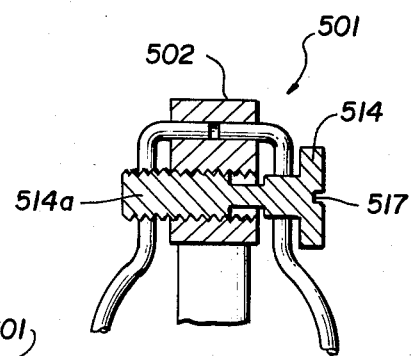

On the other hand, in the example illustrated in FIG. 10 the general structure of pin 501 is substantially similar to that of pin 401 of FIG. 9, and the portion 514a of stud 514 is provided with screw threads engageable in a corresponding tapped hole of head 502, one end of stud 514 being provided with a screwdriver slot 517 so that the stud 514 can be moved transversely from said first position to said second position, or vice versa, by screwing the stud in or out.

Figure 11:
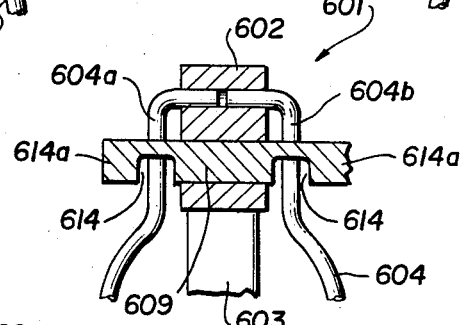

In contrast to the cotter pins 401 and 501 shown in FIGS. 9 and 10, respectively, the head 602 of cotter pin 601 illustrated in FIG. 11 receives therethrough a transverse stud 609 provided, on either side of this head, symmetrically and in front of the end portions 604a and 604b of ring 604, with a stop-forming solid portion 614a opposite a recess or notch 614. The ring can be rotated to present in front of said end portions 604a and 604b, either the stop-forming solid portion, keeping the ring 604 in bearing engagement with the pin body 603, or the notches 614 permitting pivoting of said ring 604 through an angle of about 15 to 30 degrees, the end portions 604a and 604b of ring 604 penetrating into said notches 614. To pivot the stud 609, it is also possible to contemplate at one of its ends either a screwdriver slot or a polygonal head engageable by a suitable spanner.

Figure 12:
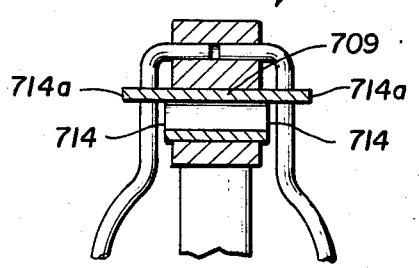

FIG. 12 illustrates a cotter pin 701 adapted to be utilized like the cotter pin 601 illustrated in FIG. 11. However, in this case the stud 709 is hollow and the notches 714 are bounded by solid portions 714a constituting transverse end lugs.

Figure 13:
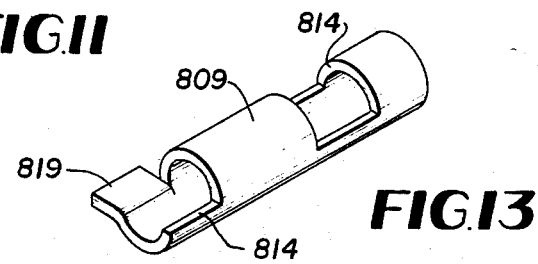
Figure 14:
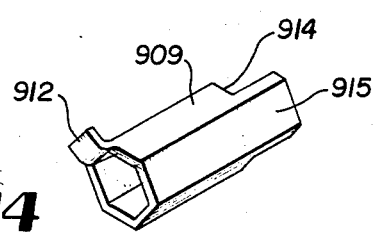
Figure 15:
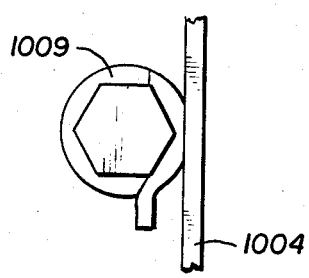

FIGS. 13, 14 and 15 illustrate modified forms of embodiment of studs 609 and 709, suitable for use in cotter pins 601 and 701 shown in FIGS. 11 and 12.

In FIG. 13 it will be seen that a tubular stud 809 has two notches 814 formed therein and an outwardly bent lug 819 adapted to limit the rotation of stud 809.

As clearly shown in FIG. 14, the tubular, polygonal-sectioned stud 909 is adapted to be engaged by a suitable spanner, and comprises at one end a notch 914 bounded by a transverse end lug 915 and at its opposite end an out-turned lug 912 constituting a convenient shoulder adapted to abut the cotter pin head (not shown).

Finally, FIG. 15 illustrates a tubular stud 1009 having a flat outer face 1018 adapted to bear against the ring 1004 for locking the stud 1009 against rotation.

Figure 16:
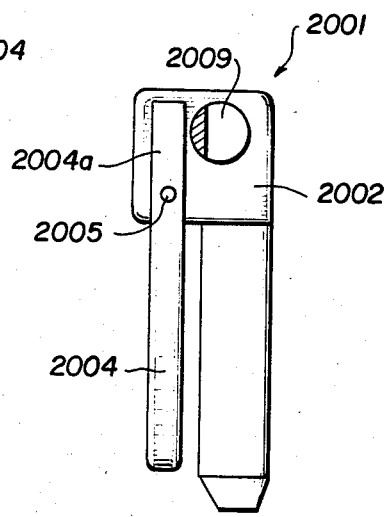

The cotter pin 2001 shown in FIG. 16 constitutes a modified form of embodiment of the cotter pins illustrated in FIGS. 9 to 15 of the drawings. Its stop-forming transverse stud 2009 is disposed behind an extension 2004a of ring 2004 beyond the pivot-forming axis 2005 thereof, said stud 2009 having if desired, the structure of any one of the studs illustrated in FIGS. 9 to 15.

Figure 17:
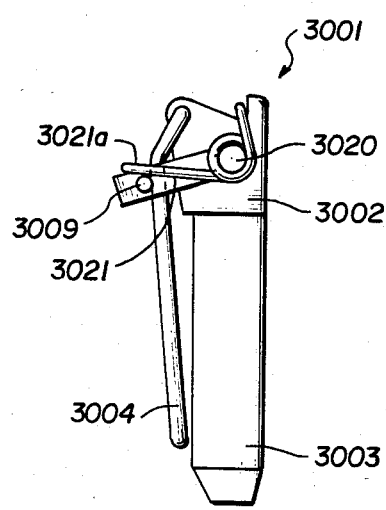

In the exemplary form of embodiment shown in FIG. 17, the stud 3009, instead of passing through the head 3002 of cotter pin 3001, extends in front of this head and is carried by a pair of lateral links 3021 pivoted to said head 3002 by means of a transverse pin 3020 so that the stud 3009 can be placed in front of ring 3004 and kept in its closed position in which it engages the pin body 3003, or above the head 3002 to permit the opening of said ring. Moreover, a return spring 3021a is associated with the links 3021 for urging same in the direction to hold the ring 3004.

Figure 18:
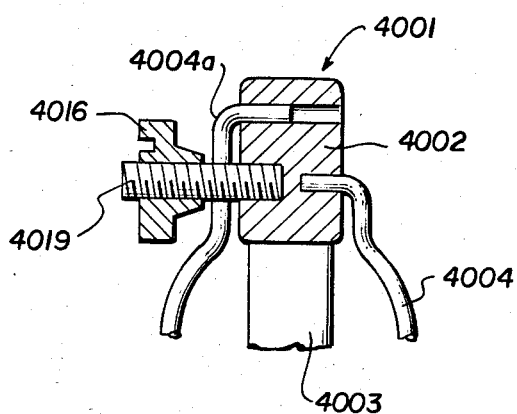

In contrast with the examples illustrated in FIGS. 4 to 17 of the drawings, FIG. 18 shows a cotter pin 4001 corresponding to the pin illustrated in FIG. 3. In fact, the head 4002 of this cotter pin is provided with a transverse stud 4009 secured to this head and extending in front of the end portion 4004a of ring 4004 so as to be somewhat spaced therefrom to limit the permissible opening of ring 4004 to an angle of about 15° to 30°. The stud 4009 is screw-threaded and carries a wedge member 4016 adapted to be screwed in or out along said stud 4009 and disposed inside or outside of the gap left between the end portion 4004a of ring 4004 and the stud 4009, for locking the ring 4004 in relation to the cotter pin body 4003.

Figure 19:
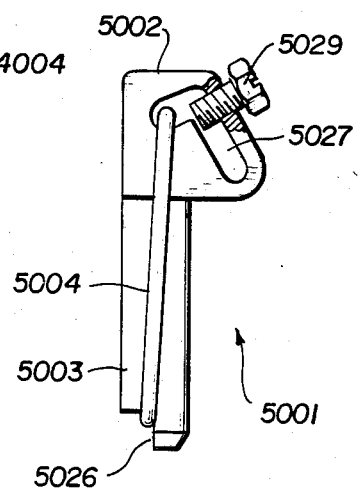
FIGS. 19 and 20 illustrate two versions of a fourth form of embodiment.
Figure 20:
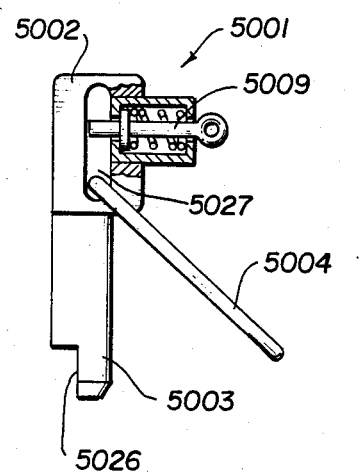

In the examples illustrated in FIGS. 19 and 20, the cotter pin 5001 has a different structure. In fact, the outer end of its body 5003 has an axial notch 5026 formed therein for engagement by the ring 5004. The pivot-forming ends of ring 5004 are engaged in elongated lateral recesses 5027 so that the corresponding ring 5004 can move axially in said recesses 5027 and thus clear the end of the cotter pin body 5003 before eventually engaging the relevant end notch 5026. To keep the ring 5004 in this position there is provided, in the example illustrated in FIG. 19, a stud consisting of a set screw 5029, or alternatively, in the example illustrated in FIG. 20, a spring-loaded bolt 5009, said set screw 5029 and bolt 5009 being adapted to penetrate into the elongated recess 5027 and thus act as a stop means to the pivot-forming ends of ring 5004.

Figure 21:
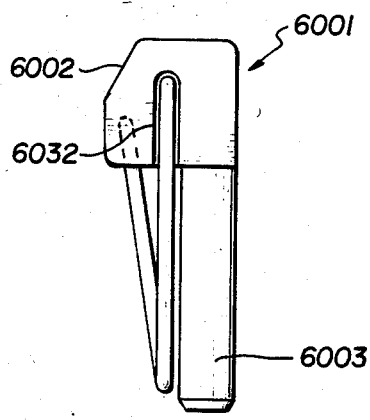
FIGS. 21 and 22 illustrate a fifth form of embodiment.
Figure 22:
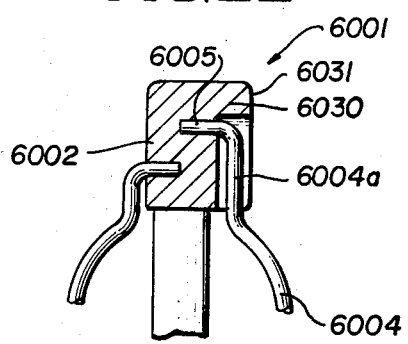

In the example illustrated in FIGS. 21 and 22, the cotter pin 6001 is free of any stud means but its head 6002 comprises an integral lateral boss 6030 having a continuous side face 6031 and a transverse face 6032 engageable by the end portion 6004a of ring 6004 adjacent its pivot-forming end 6005 when the ring 6004, in its closed position, engages the cotter pin body 6003 and is thus prevented from opening undesiredly. Since the boss 6030 of head 6002 of this cotter pin has a continuous side face 6031, the ring 6004 can pivot freely to its closed position in which its portion denoted 6004a extends behind said transverse face 6032. On the other hand, to open the ring 6004 it will be necessary to cause the end portion 6004a of ring 6004 to rise along the lateral face 6031 of boss 6030. In a modified version, the face 6032 of boss 6002 may be so inclined that the ring portion 6004a will tend to move away from the edge of boss 6030. In another modified version, this face 6032 could also be somewhat spaced from the end portion 6004a when the ring 6004 bears against the cotter pin body 6003.

Figure 23:
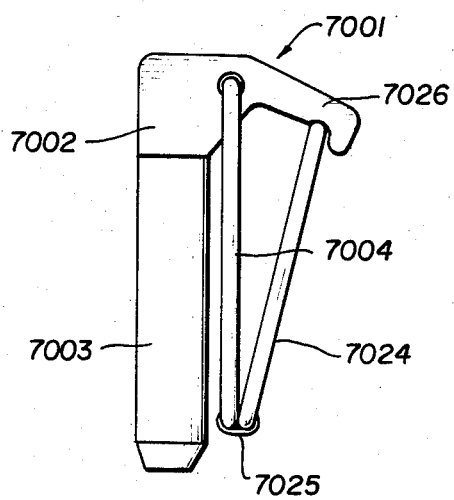
FIGS. 23 to 25 illustrate modified versions of a sixth form of embodiment of the invention.
Figure 24:
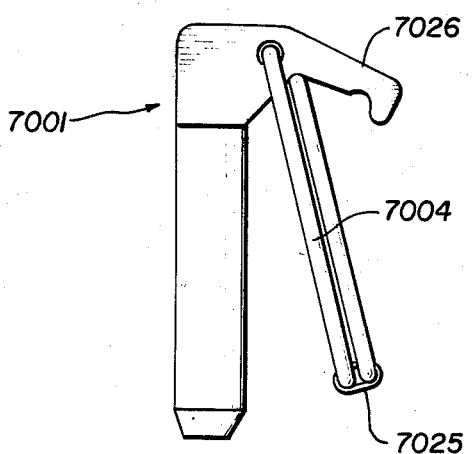

In the example illustrated in FIGS. 23 and 24, the cotter pin 7001 is free of any stud as in the last-described forms of embodiment but comprises, as a means for stopping the ring 7004, a second ring 7024 connected to ring 7004 via a spring-like element 7025 so that the two rings 7024 and 7004 form together, a deformable V-shaped assembly. The head 7002 of cotter pin 7003 illustrated in FIGS. 23 and 24 comprises an extension 7026 adapted to receive the upper end of ring 7024 when its companion ring 7004 is moved against the cotter pin body 7003, as shown in FIG. 23. When both rings 7024 and 7004 are moved toward each other against the resilient force of spring 7025, ring 7024 is released from said extension 7026, and ring 7004 can thus move away from the cotter pin body 7003 by pivoting through an angle of about 15 to 30 degrees, as in the example shown notably in FIGS. 1 and 2, to permit the insertion or the removal of the cotter pin 7003.

Figure 25:
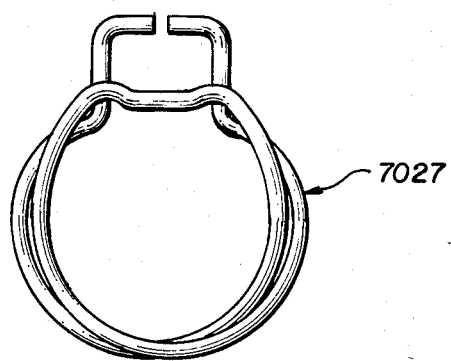

FIG. 25 shows a modified form of embodiment of the structure illustrated in FIGS. 23 and 24, wherein the rings 7004 and 7024 form together a one-piece member obtained by coiling directly two turns of a wire, the two rings forming a V-shaped structure.

Of course, the present invention should not be construed as being strictly limited by the specific forms of embodiment described and illustrated herein, since many other modifications and changes may be brought thereto without departing from the basic principles of the invention, as set forth in the following claims.

What is claimed as new is:

1. A cotter pin comprising:

a substantially cylindrical pin body which is adapted to be inserted in a pin-receiving member, a head at one end of said pin body, a substantially annular device forming an open loop, the ends of which are pivotably mounted on opposite sides of said head on substantially parallel transverse axes, said annular device being movable between a closed position and an open position, said annular device when in said closed position being located to surround the pin-receiving member to prevent any undesired removal of said pin body, and said open position being displaced from said closed position to permit said pin body to be inserted in the pin-receiving member or removed therefrom, a stop-forming element which is movable independently of any pivotal movement of the annular device, said stop-forming element being formed independently of said head and said annular device, said stop-forming element being mounted transversely on said head on an axis substantially parallel to said transverse pivot axes of the ends of said annular device, said stop-forming element being movable with respect to its axis on said head between a stop position and an inoperative position, said stop-forming element when in its stop position having at least a portion extending in front of said annular device adjacent to a pivoted end thereof so as to maintain said annular device in its closed position, said inoperative position of the stop-forming element being located to permit said annular device to move to its open position so said pin can be mounted on the member or released therefrom.

2. A cotter pin according to claim 1 wherein said stop-forming element is rotationally movable between said stop position and said inoperative position.

3. A cotter pin according to claim 2 wherein said stop-forming element has a notch which is located on an opposite side of the stop-forming element from said stop forming portion, said notch being located at a position such that the annular device is movable into the notch when the stop-forming element is in said inoperative position.

4. A cotter pin according to claim 3, wherein said stop-forming element has another notch and another stop-forming portion which are disposed opposite each other in front of the other end portion of said annular device and are operative like said first notch and said first stop-forming portion.

5. A cotter pin according to claim 3, wherein said stop-forming element has one end portion provided with a stop collar which is at the opposite end of the stop-forming element from said notch and said stop-forming portion, said stop collar bearing against said head, said stop collar having a recess which pivotally receives one end of said annular device.

6. A cotter pin according to claim 1 wherein said stop-forming element is axially movable between said stop position and said inoperative position.

7. A cotter pin according to claim 6 wherein the stop-forming element has a notch which is axially spaced along the stop-forming element from said stop-forming portion, said notch being located at a position such that the annular device is movable into the notch when the stop-forming element is in said inoperative position.

8. A cotter pin comprising:
a substantially cylindrical pin body which is adapted to be inserted in a pin-receiving member, a head at one end of said pin body,
a substantially annular device forming an open loop, the ends of which are pivotably mounted on opposite sides of said head on substantially parallel transverse axes, said annular device being movable between a closed position and an open position, said annular device when in said closed position being located to surround the pin-receiving member to prevent any undesired removal of said pin body, and said open position being displaced from said closed position to permit said pin body to be inserted in the pin-receiving member or removed therefrom,
a stop-forming element which is movable independently of any pivotal movement of the annular device, said stop-forming element being mounted transversely on said head on an axis substantially parallel to said transverse pivot axes of the ends of said annular device, said stop-forming element being movable between a stop position and an inoperative position, said stop-forming element when in its stop position having at least a portion extending in front of said annular device adjacent to a pivoted end thereof so as to maintain said annular device in its closed position, said inoperative position of the stop-forming element being located to permit said annular device to move to its open position so said pin can be mounted on the member or released therefrom,
said stop-forming element having one end portion provided with a stop collar which bears against said head, said stop collar having a recess which pivotally receives a first end of said annular device, said stop-forming element having a second end portion which in said stop position lies in front of said annular device adjacent the second pivoted end thereof, said stop-forming element being movable axially in said head between its stop position and its inoperative position, said stop-forming element when in its inoperative position having its second end portion retracted from the path of said annular device.

9. A cotter pin according to claim 8, wherein said stop collar of said stop-forming element and said head are provided with registering inclined faces, said stop-forming element being rotatable so that said inclined faces cause said axial movement from said stop position to said inoperative position due to sliding action of said inclined faces on each other.

10. A cotter pin according to claim 9, wherein said inclined faces are shaped to keep said stop-forming element either in its stop position or in its inoperative position.

* * * * *